United States Patent Office 3,235,376
Patented Feb. 15, 1966

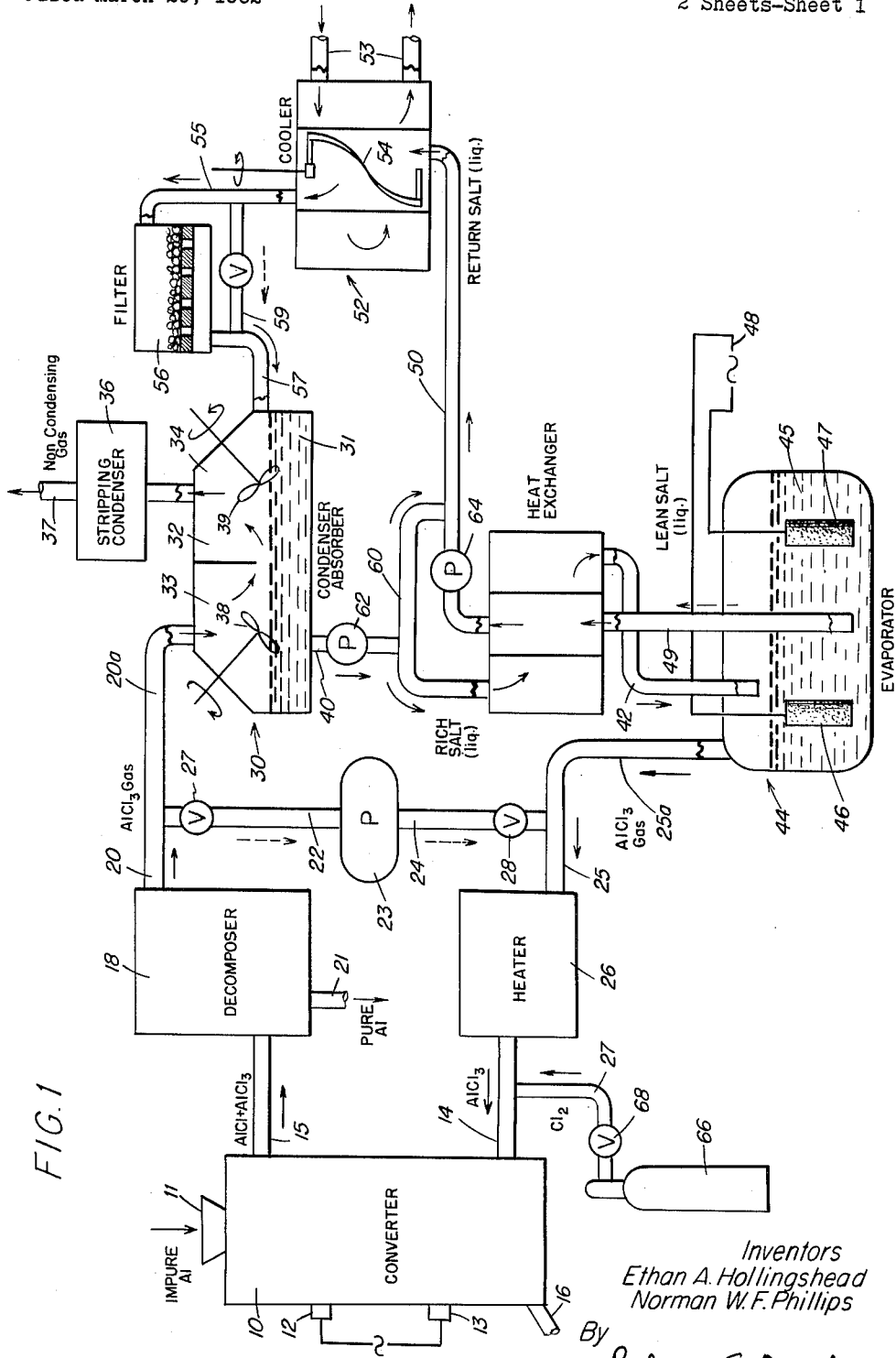

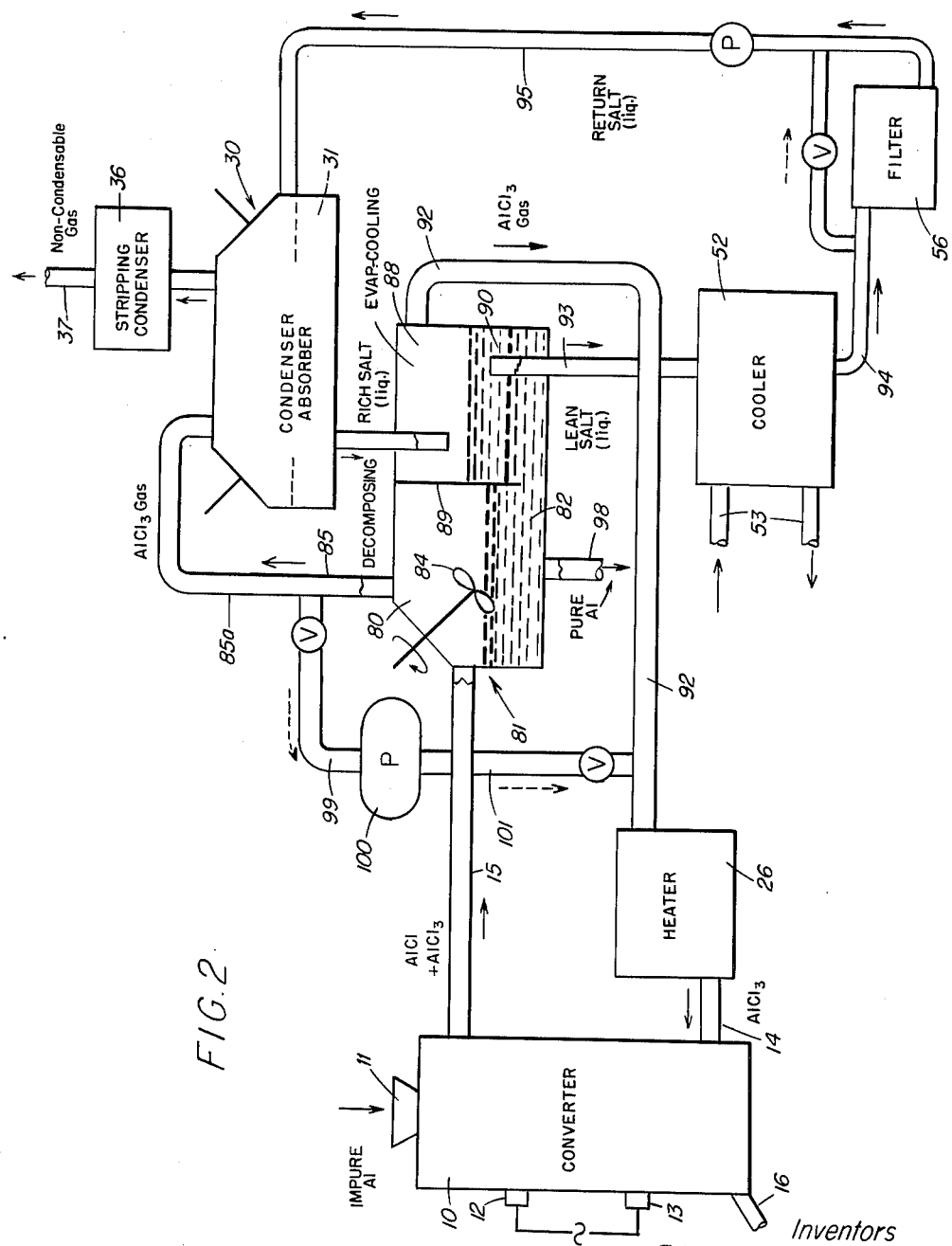

3,235,376
PROCEDURE AND APPARATUS FOR SUBHALIDE
REFINING OF ALUMINUM
Ethan A. Hollingshead and Norman W. F. Phillips,
Arvida, Quebec, Canada, assignors to Aluminium
Laboratories Limited, Montreal, Quebec, Canada, a
corporation of Canada
Filed Mar. 20, 1962, Ser. No. 181,123
16 Claims. (Cl. 75—68)

This invention is concerned with the refining of aluminum metal by so-called subhalide distillation where gaseous normal aluminum halide is employed to convert aluminum metal, from an inpure body thereof, to gaseous aluminum subhalide which is thereafter decomposed to yield purified metal and a restored quantity of the normal halide. In its primary aspects, the present invention is related to procedure and apparatus for circulating, cleaning, purifying and replenishing the normal aluminum halide, particularly for example aluminum trichloride, in a subhalide refining system.

In a particularly effective form of this subhalide process, the normal aluminum halide, preferably preheated, is brought in gaseous or vapor state into contact with impure or contaminated aluminum-bearing material, for the above reaction which converts aluminum of such material into the gaseous subhalide state, e.g. the monochloride, such reaction being effected at elevated temperature in a suitable chamber or furnace or equivalent device, conveniently called a converter. The gaseous subhalide, usually also carrying a quantity of unreacted normal halide, is then conducted to a vessel or device serving as a decomposer (sometimes also called a condenser), where at a lower temperature a reverse chemical reaction occurs, involving the dissociation of the subhalide to yield relatively pure aluminum metal which is collected as the product. This reverse reaction also yields the normal halide, thus restoring the latter to the gas stream, so that the gaseous discharge from the decomposer consists essentially, or for the most part, of such normal halide, made up of the previously unreacted quantity and the restored quantity.

It will be understood that the aluminum-containing material which is treated may assume any of a variety of forms, e.g. as aluminum alloy including other metals, carbon and the like, as derived by reduction of aluminum ores, another example of impure aluminum being aluminum scrap or scrap mixtures and similar bodies. The converter may assume any of various structures, as to handle a batch, or an incrementally fed and advanced charge of granular or lump material, or to present the material in molten state, the apparatus in all cases being arranged for supply of heat and for traversal by the halide gas stream for the desired contact and reaction with the aluminum. In general, the decomposer may likewise assume a variety of forms, including provision for heat removal, i.e. to maintain the desired lower temperature and extract the heat of the reverse reaction, whereby aluminum metal, preferably in highly purified condition, is deposited. Although some operations have contemplated deposition of the metal in solid state, it is presently preferred that it be released and collected in molten form, i.e. under temperatures appropriate to maintain such result. Preferred temperatures of reaction in the converter are ordinarily in the range of about 1000° C. and upwards, present preference being especially concerned with temperatures of 1200° C. to 1400° C. or so, while the gas is circulated under pressure appropriate for desired efficiency in the converting and decomposing regions, e.g. at sub-atmospheric or more preferably higher pressures, such as atmospheric or slightly above.

As explained, the normal halide, for example, aluminum trichloride ($AlCl_3$) or aluminum tribromide ($AlBr_3$), which are also commonly called aluminum chloride and aluminum bromide, is converted at least in part to the subhalide, viz. aluminum monochloride or aluminum monobromide, which is thereafter decomposed to revert to the normal salt and to deposit the metal. It is at present greatly preferable to employ aluminum trichloride for the process, yielding the monochloride in the converter outlet (to carry the aluminum in gaseous combined form), so that in important specific aspects the invention is related to monochloride refining of such metal.

Whereas it has been proposed to make effective re-use of the normal halide, e.g. aluminum trichloride, by recirculating it through a closed system from the decomposer to the converter, either directly or through vessels where the compound is first condensed to solid state and then resublimed, a number of difficulties have been encountered in such operations. Thus it is troublesome to vaporize the halide, e.g. aluminum chloride, in ordinary equipment or operations, because of poor heat transfer properties, development of insulating crusts, and the like. Moreover, it has been found, with respect to any type of recirculation, that the gas in the aluminum refining system tends to become contaminated or diluted with foreign matter, particularly other gaseous material of a non-reacting sort, i.e. gas which is inert or of no use in the desired reactions.

That is to say, non-condensable or so-called permanent gas commonly appears and builds up, chiefly from materials introduced into the system, especially the charge of impure aluminum, although leakage or other fortuitous circumstances may contribute to the dilution of the halide stream. Important examples of such non-reacting gas are hydrogen, methane and the like, formed from traces of moisture carried by the raw material, e.g. the aluminum alloy or other composition under treatment, there also being non-metallic materials present in the converter, especially carbonaceous matter as in the alloy, or in the electrodes or other structure. As will be apparent, increase in content of foreign gaseous matter impairs the effectiveness or efficiency of the operations.

As will now be appreciated, the present invention is directed to improvements whereby the aluminum chloride may be in effect recirculated, while being cleaned or purified, in such manner as to avoid the foregoing and other difficulties, or some of them. Further objects are to provide new and effective procedure for condensing and re-evaporating the halide gas, and likewise for re-plenishing the circulating quantity of such gas in the system. In the latter respect, it may be noted that there is likely to be a small but continuing depletion of the halide, not only by fortuitous leakage or other mechanical loss, but also by unavoidable side reactions (as with other things in the charge or structural parts of the system) which ordinarily may not result in contamination of the aluminum product but nevertheless represent loss of suitable reactant halide values.

To the foregoing and other ends, an important aspect of the present invention, for removing foreign gases or preventing their build-up (and for maintaining a full circulating quantity of normal halide), resides in the discovery that normal halide gas, e.g. as circulated in the subhalide refining system, can be absorbed in a molten salt bath quite effectively, and that such bath can thereafter be heated, in an appropriate way, so as to evaporate or volatilize the absorbed halide, for example, whereby the restored gas can continue on its path in the recirculating system of the aluminum refining operation. Accordingly, a feature of the present process involves directing the subhalide gas into contact with molten salt, e.g. a selected molten salt mixture which is stable and which will absorb the halide and thereafter release it on heating. As the halide is absorbed, thus condensing it in a liquid mixture, the remaining gas of the supplied stream is appropriately discharged, thus eliminating all non-condensable, gaseous matter, such as hydrogen or the like, which would otherwise build up and dilute the halide. The process embraces the further step of heating the molten salt, which is now enriched in halide, to drive off such halide in gaseous state, such operation being conveniently performed in a further vessel or region, especially where a continuous process is desired. The molten salt can then be conveniently recirculated, very preferably with intermediate cooling, to the absorbing chamber or zone, to replenish the salt bath there. This method of condensing and re-evaporating the halide, e.g. aluminum trichloride, in and from a molten salt carrier, is highly effective; it not only permits essentially complete removal of non-condensable gas from the stream under treatment, but also solves the problem of evaporating the halide, such as aluminum trichloride, and provides for continuity of operation in that all steps may progress continuously, including the transfer of enriched salt, and the recirculation of chloride-impoverished salt. In other words, the gaseous trichloride stream, while physically changing state by absorption into the molten salt and re-evaporation therefrom, is continuously supplied and reestablished essentially as if it were passing continuously in the vapor phase, without change.

While provisions of the above sort can be made to handle the entire current of halide gas in the subhalide refining circuit, an effective and often sufficient way to prevent the build-up of undesired gases is to condense only a portion of the circulating normal halide to non-gaseous state, while removing the non-condensable gas, at least to a substantial extent, from such halide portion. In particular, a new and unusually satisfactory procedure involves continuously absorbing or otherwise condensing the withdrawn flow of halide in one region while discharging all other gas and continuously displacing condensed halide into another region in which it is continuously re-evaporated and from which the reestablished halide vapor is returned to the major circuit. In practice, this method has special advantages of continuity of operation, requiring no batch or alternated treatments and being readily maintainable at a condition of equilibrium. As stated, the diluent gas content (especially non-condensables, or so-called permanent gas) in the circulating system can thus be kept to a desired minimum by processing only a part, indeed often only a very minor part, of the main stream. The amounts of gas removed need be no larged than the progressive increments coming into the stream from the charge in the converter or otherwise.

These operations on only a part of the circulating gas thus provide a continuous cleaning of such part and provide a constant, auxiliary supply of the halide gas, e.g. aluminum trichloride, free of the other gases, which is then continuously returned to the circulating system. Although the above-described procedure of absorption in molten salt and subsequent volatilization therefrom is effective in this special concept of a continuous cleaning operation requiring treatment of only a minor part of the gas flow, it will be understood that other types of continuously-functioning condensation and evaporation may be employed. In all cases there is substantial economy, as in cooling operations and in requirements of heat energy for evaporation, by reason of the fact that only a minor part of the total aluminum trichloride is treated. As will be understood, the portion of such halide subjected to condensation, with corresponding removal of non-condensables, will generally determine the circulating load of the latter material in the system; hence such proportion can be selected, for any system, to achieve the desired limitation on the presence of diluent gas.

In the operations where condensation of trichloride is effected in molten salt, the latter may have various compositions, so long as the requirements noted above are satisfied. For example, binary mixtures of aluminum trichloride and sodium chloride, particularly such mixtures containing not less than 50 mole percent aluminum trichloride, are suitable. Some ternary mixtures of potassium, sodium and aluminum chlorides are also appropriate. Aluminum chloride-sodium chloride mixtures of the character stated, which have liquidus temperatures in the range of 100° C. to 190° C. and which are capable of absorbing 50% to 100% of their weight of aluminum trichloride at one atmosphere pressure are particularly satisfactory. Ternary mixtures as also just described, may have even lower melting temperatures. Another appropriate salt mixture is aluminum trichloride and potassium chloride, which would not ordinarily be as inexpensive as the binary mixture with the sodium salt. Further salts, useful as second components, i.e. along with aluminum trichloride in molten salt mixtures for absorbing the latter and for its subsequent evaporation therefrom, are nickel, lead, chromium, ferrous iron and cobalt chlorides; they are, however, more volatile and more expensive than the alkali chlorides which are therefore greatly preferred. In a more general sense, the salt mixture should consist of the normal aluminum halide with one or more other metal halides, such as to form a composition which remains molten at conveniently low temperatures as indicated above and from which substantial quantities of the aluminum salt may, after absorption therein (as also noted above), be selectively evaporated therefrom.

As indicated above, some replenishment of the normal aluminum halide in the circulating stream of the refining system is usually needed from time to time, or preferably by a continuous supply, although very minor in amount relative to the passing halide. To such end, an unusually effective procedure is to feed elemental halogen, e.g. in gaseous form, into the traveling halide gas line or the converter, i.e. just after, as, or just before the main stream of gas enters the converter. Thus in the systems herein described, the make up of aluminum trichloride is effectively achieved by introducing chlorine gas into the conduit for recirculated aluminum trichloride at a locality intermediate the preheater and the converter, or directly into a separate entrance of the converter, so that such chlorine is directed to a region where aluminum metal is present (particularly such metal which is to be treated by sub-halide distillation) and reaction can take place between the chlorine and aluminum to produce aluminum trichloride. Alternatively, the chlorine can be introduced at other localities of the circuit, as upstream of the heater. Ordinarily, it is preferable to supply the chlorine to a stream of trichloride (which may be any one of several if there are several directed to the converter) so as to dilute and distribute the halogen promptly, while preference for such mode of addition is also indicated to avoid prolonged carriage of elemental chlorine or the like through structures or equipment which it might attack.

In the described fashion, by prompt reaction of the chlorine with aluminum, aluminum trichloride is continuously replenished in the gaseous state, in a system which is designed for effectuation of the refining reaction between aluminum trichloride and aluminum metal to yield the desired monochloride. It might be simpler and more economical in such systems to add aluminum trichloride, as such, at a suitable place where it would evaporate, but it is difficult to obtain or prepare thoroughly dry aluminum trichloride, e.g. for continuous feed over long periods of time; as manufactured in any way outside the closed system of the refining circuit, such compounds tend to contain moisture, and in the presence of moisture the halide reacts with aluminum to yield products which include hydrogen and alumina, thus wasting a little of both reactants and building up undesirable hydrogen in the system.

Various modifications of the system for condensing aluminum trichloride by absorption in molten salt and for re-evaporating the halide can be used. For example, one such modification involves a system wherein the decomposition of the monochloride (sub-halide) content of the gas from the converter is effected by contact with molten aluminum, into which the released aluminum is absorbed. In such arrangements heat removal (i.e. cooling) of the molten aluminum is conveniently achieved by contact with molten salt, for example in a separate chamber. Accordingly, instead of circulating the molten salt from the trichloride condenser-absorber of the present process to a separate evaporator, such salt can be circulated to the cooling section of the stated type of decomposer, which then functions as the trichloride evaporating stage. That is to say, in this fashion the heat of decomposition of monochloride is utilized by indirect transfer through the molten aluminum to the salt bath in the cooling chamber, to effectuate re-evaporation of trichloride from the latter bath.

As will be appreciated, each of the above-described trichloride condensing and evaporating operations is applicable to treatment of the entire trichloride stream, or alternatively to only a portion of it as explained above. Likewise, while in the latter type of operation the partial or minor flow of aluminum halide vapor for cleaning treatment is usually withdrawn from a locality at or downstream of the decomposer and returned to a region still further downstream in the main circuit (as beyond a circulating or pumping device), it is alternatively conceived that the re-evaporation of trichloride can be otherwise arranged or the vapor otherwise delivered. For example, the re-evaporated, partial flow of trichloride vapor can be restored at a place upstream of the withdrawal point, or even in the decomposer itself.

For illustration of the process, certain effective systems utilizing important features of it, are shown in the accompanying drawings, wherein:

FIG. 1 is a diagrammatic view or flow sheet of one example of a system for refining aluminum by the subhalide process, including a number of the present improvements; and FIG. 2 is a similar view, showing modifications in the system, including the decomposer and the gas cleaning and re-evaporating circuit.

In the drawings, all of the elements of the apparatus are shown in highly simplified or diagrammatic form, and indeed in at least most instances are shown in an essentially symbolic manner, it being believed that appropriate structural details for actual operation will be readily known or understood and need not be given here. It will be understood that all elements of the systems are made of or lined with substances suitably resistant to the reactant gases or the like that are present, the materials of construction or lining also having appropriate thermal or other insulating properties where necessary; thus refractory materials are ordinarily contemplated for the interior of most vessels or chambers, although in general such are omitted from the drawings for simplicity.

In FIG. 1, the converter 10, which may be of any suitable type, is shown for example as adapted for incremental supply of impure aluminum at an appropriately gated or sealed hopper 11, so that the charge of such material, electrically heated by electrodes 12, 13, is treated with aluminum trichloride gas entering from the conduit 14. Metallic aluminum is converted to aluminum monochloride which discharges, usually along with unreacted trichloride, in the conduit 15, while spent charge, i.e. aluminum-depleted, is removed, as at an outlet lock 16. The conduit 15 extends to a decomposer 18 which may be of any suitable design (e.g. such as a known design), and in which by appropriate cooling means (not shown) the sub-halide is decomposed to aluminum metal which collects in molten form, while the restored normal halide along with the unreacted halide is delivered in the outlet conduit 20. Thus by the desired refining operation, highly purified aluminum may be tapped off through a suitable pasage 21, while the conduit 20 passes a gas which consists essentially of aluminum trichloride.

The entirety of the gas leaving the decomposer may be subjected to cleaning by absorption and re-evaporation, or alternatively only a part of it may be so treated. In the latter event, the major stream of the gas passes through conduit 22, a suitable pump or other circulating device 23, and another conduit 24 to a return conduit 25, advantageously leading the gas to a heater 26 and from the latter through the conduit 14 back into the converter. In this system it will be understood that the reaction in the converter is effected at an appropriately high temperature, e.g. 1000° C. and above, and preferably upwards of 1200° C. The gas is substantially lower in temperature at the decomposer, but nevertheless advantageously remains above the melting point of aluminum, and then in the heater 26, is preferably raised again to a temperature of or approaching that of the desired reaction in the converter.

In accordance with the present invention, all or part of the trichloride gas from the conduit 20 is passed through a further pipe 20a to the cleaning circuit, from which a corresponding flow of gas is delivered in the pipe 25a, to the conduit 25. Although ordinarily the system might be pre-designed for operation of the cleaning section only with all or only with a part of the circulating gas, FIG. 1 shows, for purposes of illustration, a pair of valves 27, 28 in the lines 22, 24 respectively so that by appropriate selection of conduit or pipe sizes in the associated lines (and with further valves if necessary), one or the other of these types of operation may be selected.

Referring to the gas cleaning system, the pipe 20a opens into a suitable condenser-absorber 30, a device where the gas is exposed to a molten salt bath, e.g. a molten salt mixture of aluminum trichloride and sodium chloride. This device preferably has means to keep all structural surfaces wetted with the molten salt, to prevent formation of solid deposits; these means, such as vertical screw lifts, or inclined or horizontal splashing devices further coact in promoting the desired condensation, i.e. absorption, of the aluminum trichloride. For example, the device 30 may comprise a chamber holding a pool of the molten salt 31 and divided into two sections as by a baffle 32 extending down almost to the level of the salt body 31. The incoming gas from the pipe 20a enters the chamber section 33, for at least partial absorption by the salt; the remaining gas passes under the baffle 32 into the chamber section 34, for further absorption. From the latter chamber section, the gas, essentially depleted of aluminum trichloride, traverses a stripping condenser 36, which may be employed, if desired, to remove any remaining, small amounts of condensable material, and from which gas is finally discharged through a pipe 37, i.e. gas now consisting essentially of non-condensable substances, such as hydrogen, methane, nitrogen, or the like.

Splashing means are shown as constituted by a pair of inclined, continuously rotated propellers or wheels 38, 39, respectively dipping into the pool in the chamber sections 33, 34, whereby liquid salt is vigorously thrown about, completely wetting the interior of the chamber and effectively absorbing the aluminum halide.

From the absorber 30, the molten salt, enriched with absorbed aluminum trichloride, is advanced through a pipe 40, a heat exchanger 41 and a further pipe 42 into an evaporator 44, which may have any suitable form, but which may advantageously constitute an insulated chamber holding a pool of the molten salt 45 and having a pair of graphite (or suitable metal) electrodes 46, 47 submerged in such pool. Thus in the evaporator, the molten salt mixture is heated internally, being used as resistor or flow of current between the electrodes, the latter being supplied with appropriate electrical power from a suitable source 48. While as just indicated, other evaporating or volatilizing devices may be employed, the electrical resistance heating of the molten salt, by passing current through it, is unusually effective, as in avoiding difficulties of heat transfer, crust formation, or the like, as encountered in some other attempts to vaporize aluminum trichloride, i.e. unless the latter is kept under such pressure that it is molten itself. It may be explained that aluminum trichloride alone is not sufficiently conductive for ordinary electrical resistance heating, but the other components of the bath, such as sodium or potassium chloride, afford appropriate conductivity for the passage of heating current in suitable amount. The gaseous aluminum trichloride thus vaporized or in effect boiled from the salt bath, is discharged into the pipe 25a for return to the circulating system (conduit 25), preferably at a small elevation of pressure, e.g. to take care of pressure drop in the converter circuit or to equal pressure rise at the circulator 23 where and if the main trichloride flow is by-passed.

Lean molten salt, i.e., now reduced in aluminum trichloride content, is withdrawn as from a lower point in the pool 45, through a pipe 49, the heat exchanger 41 and into a further pipe 50. Thus the heat exchanger, while not essential in all cases, aids desirably in transfer of heat from the lean salt in the system 49, 50 to the enriched salt in the system 40, 42 for conservation of energy, especially in the evaporating stage; the enriched salt is thus somewhat preheated before evaporation treatment, and the lean salt is likewise somewhat cooled, before return to the absorber.

As a presently preferred way of maintaining a selected low temperature of the salt in the absorber, for the desired condensation, the return flow of molten material through the pipe 50 traverses a suitable cooler 52, as of any conventional construction, preferably having means 53 for circulation of water or other coolant fluid and having appropriate scraping means as diagrammatically indicated at 54 to prevent build-up of solids on chilled surfaces. Although the outlet pipe 55 of the cooler can, if desired, run directly to the condenser-absorber 30 for return of the cooled liquid (molten) salt, it is at present preferred, as in the embodiments shown, to carry the liquid from the pipe 55 into and through an appropriate filter 56 (or strainer or the like), from which the liquid then goes back to the second section 34 of the absorber through pipe 57. In this way any foreign solid particles, such as might be condensed or deposited from entrainment in the gas, or such as might otherwise get into the circulating salt, are readily removed. If it is sufficient to filter only part of the flowing salt or if filtration is unnecessary, part or all of the return flow may be by-passed through the pipe 59, shown as valved for selective use.

Where optimum operating conditions are achieved by having a large volume of molten salt in the absorber, i.e. more than needs to be traversed through the evaporator to keep the salt system in balance with aluminum trichloride content, some of the salt leaving the absorber may be by-passed through the pipe section 60 from the pipe 40 into the return pipe 50 which leads to the cooler. It will be understood that appropriate pumping or circulating means are employed in the molten salt circuit wherever gravity flow cannot be used, or indeed wherever convenient and necessary. Thus simply by way of example, a pump 62 is shown in the line 40 for directing molten salt into both the heat exchanger and the line 60, while a pump 64 in the line 50 (conveniently upstream of the connection of pipe 60) draws returning lean salt from the evaporator through line 49 and the heat exchanger, these pumps cooperating to complete the return of salt through the cooler to the absorber.

As will now be seen, the gas flow from the pipe 20a traverses the sections 33, 34 of the absorber in succession, generally countercurrent to the return of molten salt into the section 34 and out of the section 33. The aluminum trichloride is essentially all absorbed by the salt so that non-condensable gases are separated and removed through the pipe 37. At least part of the salt, enriched in trichloride, and heated in the heat exchanger 41, is subjected to the action of the evaporating stage in the vessel 44, where the temperature is such as to deliver trichloride gas in the line 25a at the pressure desired for the main refining circuit. From the evaporator (and also, as shown, in part from the original discharge from the absorber) return flow of molten salt goes through the cooler, and likewise the filter (which can be cleaned at intervals, as necessary) for separation if solid materials, so that it again enters the absorber at a considerably lower temperature to continue the condensation of aluminum trichloride.

To make up for continuing small losses of normal aluminum halide in the refining circuit, FIG. 1 shows diagrammatically a system for feeding chlorine gas into the gas inlet conduit 14 of the converter, e.g. comprising a source of chlorine 66 and a feed pipe 67 having appropriate flow control means indicated by the valve 68 and leading into the conduit 14.

By way of example of a gas cleaning procedure performed in the system of FIG. 1, it may be assumed that, as by having the values 27 and 28 closed, the absorber-evaporator circuit is arranged to handle the entire gas flow of a refining operation of moderate size under continuous occurrence in a converted 10 and decomposer 18. Thus it is specifically assumed that the circulating flow of aluminum trichloride is 20,000 pounds per hour, entering the pipe 20a at 700° C. and a pressure of one atmosphere. The operation is such as to restore an identical flow of aluminum trichloride gas in the line 25a at a pressure of 1.3 atmospheres, e.g. sufficient to carry such gas through the heater 26, where it is raised to 1200° C. or so, and then through the converter 10 for the aluminum-converting reaction at a temperature say of 1300° C. For such operation, the following values of flows, salt concentrations and temperatures are appropriate, e.g. also to maintain the stated temperatures at various localities in the circuit. Thus molten salt in amount of 267,000 pounds per hour, at a temperature of 135° C. enters the second section 34 of the absorber, flowing through to the first section 33 while absorbing the aluminum trichloride, e.g. considered as its entirety of 20,000 pounds per hour, so that there is withdrawn into the conduit 40, 287,000 pounds per hour of molten salt at 200° C., containing 61 mole percent of aluminum trichloride, the balance being sodium chloride. 150,000 pounds per hour of this salt mixture is by-passed through pipe 60 to the return pipe 50, while the remainder 137,000 pounds per hour, after traversing the heat exchanger, enters the evaporator 44 through the pipe 42 at 425° C. The evaporating stage, requiring approximately 1260 kilowatts of power, vaporizes 20,000 pounds per hour of aluminum trichloride at the required pressure of 1.3 atmospheres, delivering such gas at approximately 490° C. From the evaporating section the molten salt mixture, now reduced from 61 mole percent to 56 mole percent aluminum trichloride, is withdrawn through the pipe 49 in amount of 117,000 pounds per hour and at a temperature of 490° C. Leaving the heat exchanger at 225° C., the last-mentioned flow of salt joins the by-passed flow in line 50, to make up the return stream of 267,000 pounds per hour for the absorber, such total stream containing about 59.1 mole percent aluminum trichloride, and being cooled to the entering temperature of 135° C. by extraction of energy at the rate of about 2570 kilowatts in the cooler 52.

Thus in this example, the entire flow of gas, consisting essentially of aluminum trichloride, is in effect circulated from and to the refining elements, while cleaning it of non-condensable gases. For makeup of trichloride, as in the refining operation where the impure aluminum in converter 10 is aluminum alloy resulting from thermal reduction of aluminum ores, chloride gas may be continuously supplied to the conduit 14 from the source 66 in amount of 10 to 35 pounds per hour, or from about 0.05% to about 0.15% or 0.2% of the total stream of trichloride entering the converter. As stated, in this convenient way, by essentially immediate reaction of the chloride with aluminum in the converter, depletion of aluminum trichloride in the circulating gas is continuously made up.

It will be understood that where only a minor proportion of the circulating trichloride gas is put through the cleaning system, e.g. from 1% to 40%, or preferably from about 2% to 10% of such flow, the flow rates, quantities and other conditions of operation in the cleaning system are proportionately adjusted. Such procedure, i.e. of keeping the circulating load of nonreacting material within a constant limit by continuously cleaning a minor part of the stream, is particularly applicable to refining systems of moderate to large capacity, e.g. having an aluminum trichloride flow of 60,000 pounds per hour and higher, viz. 600,000 cubic feet per hour of gas having a density of 0.1 pound per cubic foot. In the latter condition, it may be desirable, for example, to circulate, for cleaning, only 1200 to 2400 pounds per hour of the aluminum trichloride, i.e. an amount selected in the range of 2% to 4% of the main flow. As will be understood, in this type of operation, the valves 27, 28 are opened and the circulator 23 is operated, to carry the gas which does not traverse the cleaning circuit.

In the modified system of FIG. 2, the evaporation step of the cleaning process is performed by the heat removing action of molten salt in the cooling section of a splash-type decomposer. Thus the monochloride-containing gas in the conduit 15 from the converter 10 enters the decomposing or condensing section 80 of the decomposer 81, where it traverses a voluminous spray of molten aluminum, produced from the pool 82 of such metal by the rotating propeller or wheel 84, or other splashing device. Being cooled by the molten metal, the monochloride dissociates to deposit aluminum in the streams or drops of such metal, yielding a restored full stream of aluminum trichloride in the exit pipe 85. The latter (continuing at 85a) carries the gas into the condenser-absorber 30, where its aluminum trichloride content is absorbed in the molten salt pool 31, so that exit gases, after traversing the stripping condenser 36, continuing essentially only non-condensable material as they leave through the pipe 37.

From the absorber 30, the molten salt is advanced to a second section 88 of the decomposer 81, saparated from the section 80 by a partition 89 which extends beneath the surface of the molten aluminum 82, but allows circulation of the latter between the chamber sections. A layer of molten salt 90 is continuously maintained floating on the aluminum in the cooling section 88 so as to remove heat from the metal, and thus by conduction through and circulation of the latter, to extract the heat of the decomposition reaction in the chamber 80. By such heating of the molten salt, continually replenished with aluminum chloride-enriched material from the absorber 30, the aluminum chloride is vaporized and returned to gaseous state through conduit 92 to the converter 10, i.e. to constitute the supply of such aluminum trichloride for the reaction there. Lean or spent salt from the floating pool 90 in the decomposer is advanced through pipe 93 and cooler 52, the latter functioning as in FIG. 1, and then through the pipe 94 to the filter or similar device 56 (if desired), for removal of solids. From the filter, the cooled molten salt mixture is returned by pipe 95 to the end of the absorber 30 and for continuing repetition of the described cycle.

As will be seen, the basic principles of the process and system of FIG. 2 are similar to those of FIG. 1, in that the trichloride gas is continuously cleaned by being condensed and absorbed in molten salt, from which it is thereafter evaporated, the arrangement in FIG. 2 being such that the heat for evaporation is derived from the decomposition reaction in the monochloride refining process. Thus the trichloride is continuously recirculated and cleaned, while purified aluminum is built up in the pool 82 of the decomposer, for tapping from time to time, as product, through the pipe 98.

In the light of the previous example, it is believed unnecessary to recite particular temperatures and quantities of salt flow for the operation of FIG. 2, it being plain that conditions are adjusted to provide corresponding situations of temperature at various points in the molten salt circuit, having in mind the rate of heat evolution by the decomposing reaction, such heat being required to be absorbed by the molten salt at 90. While the system of FIG. 2 is appropriate for cleaning action on the entirety of the circulating aluminum trichloride, it is also adapted for use in the specific procedure wherein only a part of the trichloride flow is so treated. In the latter type of operation, a portion, usually the major amount, of gas is by-passed in the line consisting of conduit 99, circulator 100 and conduit 101. It will be understood that in such circumstances supplemental heat removal means may be required for the decomposer, i.e. if the vaporization of aluminum trichloride from the salt layer 90 is insufficient to absorb all of the heat of reaction in the chamber 80.

As will now be understood, the improved procedures and systems of the invention afford an effective way of circulating, cleaning and replenishing the flow of normal aluminum halide gas in a subhalide refining system for aluminum, e.g. so as to remove permanent gases effectively, or to keep them at a convenient level, and to prevent their hampering the process by dilution or otherwise.

The method of evaporating an aluminum halide by supplying same to a molten salt mixture and passing current through said mixture as shown at 44 in FIG. 1 and as correspondingly described hereinabove, and the evaporator device 44 including provisions for passing current through a molten salt mixture to vaporize aluminum halide therefrom, are not claimed herein but are described and claimed in our copending application Serial No. 236,333, filed November 8, 1962 for Evaporation of Aluminum Halide.

It is to be understood that the invention is not limited to the specific steps and devices herein shown and described but may be carried out in other ways without departure from its spirit.

We claim:

1. A process for separating gaseous impurity, of permanent gas, from a flow of aluminum trichloride gas containing such impurity, comprising advancing said flow into a condensing region and there condensing aluminum trichloride by absorption in a molten salt mixture containing aluminum trichloride, at a temperature of said mixture for absorption of aluminum trichloride therein, while withdrawing the uncondensed remainder of said flow, comprising said gaseous impurity, from said region, and thereafter heating said aluminum trichloride-enriched molten salt mixture to evaporate aluminum trichloride therefrom, for reestablishing said aluminum trichloride in gaseous form, purified with respect to said impurity, said evaporation of aluminum trichloride from the salt mixture being effected by advancing said molten salt mixture from the condensing region to another region and there supplying heat to said enriched molten salt mixture to evaporate aluminum trichloride, said process including cooling the molten salt mixture after evaporation of aluminum trichloride therefrom and recirculating said mixture to the condensing region for repeated absorption of aluminum trichloride therein, said molten salt mixture being a mixture which consist essentially of aluminum trichloride and other metal chloride, and which in molten state is capable of absorption of aluminum trichloride therein and of evaporation of said normal aluminum trichloride therefrom.

2. In procedure for subhalide refining of aluminum wherein gas is continuously circulated along a path through a converting region for reaction of gaseous aluminum trichloride, in said gas, to convert aluminum metal to gaseous aluminum monochloride, and through a decomposing region for decomposition of said monochloride to yield purified aluminum and gaseous aluminum trichloride, the process which comprises continuously advancing aluminum trichloride gas, which carries gaseous impurity, of permanent gas, from the decomposing region into a condensing region and there condensing aluminum trichloride by absorption in a molten salt mixture containing aluminum trichloride, at a temperature of said mixture for absorption of the aluminum trichloride therein, separating the uncondensed remainder of said impurity-carrying gas from the condensing region, circulating said molten salt mixture through the condensing region and from said region, as aluminum trichloride-enriched molten salt, to another region, supplying heat to said enriched salt mixture at said other region to evaporate aluminum trichloride while directing the produced aluminum trichloride gas into the first-mentioned path of gas circulation, said molten salt mixture being continuously circulated from said other region as aluminum trichloride-depleted salt, to the condensing region, and then again in enriched form to the said other region, said molten salt mixture being a mixture which consists essentially of aluminum trichloride and other metal chloride, and which in molten state is capable of absorption of aluminum trichloride therein and of evaporation of said normal aluminum trichloride therefrom.

3. Procedure as defined in claim 2, wherein the enriched molten salt mixture traveling from the condensing region to the other region is brought into heat exchange relation with the depleted molten salt mixture being recirculated from said other region, for simultaneously heating the enriched mixture and cooling the depleted mixture.

4. Procedure as defined in claim 2, wherein the major quantity of the gas circulated through the converting and decomposing region is directly recirculated to the converting region from the decomposing region, while said step of advancing aluminum trichloride gas into the condensing region is effected with only a minor portion of the recirculating gas stream.

5. Procedure as defined in claim 2, which includes the step of decomposing the aluminum monochloride-containing gas by exposing it to molten aluminum, while cooling said molten aluminum by circulating same into contact separately with a body of the aforesaid molten salt mixture at a region which constitutes the aforesaid other region, said molten salt mixture being the aluminum trichloride-enriched mixture circulated from the condensing region and said heating of the molten salt mixture to evaporate aluminum trichloride being effected with heat from the molten aluminum, derived by the decomposing reaction in the decomposing region.

6. In procedure for subhalide refining of aluminum wherein gas comprising normal aluminum halide is continuously advanced through a converting region for reaction of said normal halide with aluminum metal to convert said metal to gaseous aluminum subhalide, and wherein gas containing said subhalide is continuously advanced from said converting region through a decomposing region for decomposition of said subhalide to yield purified aluminum and gaseous normal aluminum halide, and wherein permanent gas becomes a component of the gas traversing said converting and decomposing regions, the process of providing for re-use of normal aluminum halide in the converting region, which includes continuously directing gas from the decomposing region, containing normal aluminum halide, to a condensing region and there continuously condensing the normal halide to non-gaseous state while separating and discharging all permanent gas which accompanied said condensed halide, continuously transferring said condensed halide to a region other than said condensing region, said condensed halide in said other region being established in a molten salt mixture, supplying heat to said molten salt mixture in said other region to evaporate normal aluminum halide continuously from said molten mixture and thereby to reconvert said normal aluminum halide to gaseous form, and redirecting the restored gaseous halide to the converting region for re-use, all of the aforesaid normal aluminum halide being of halogen from the class consisting of chlorine and bromine and said molten salt mixture being a mixture which consists essentially of normal aluminum halide and other metal halide, of halogen from said class, and which in molten state is capable of absorption of normal aluminum halide therein and of evaporation of normal aluminum halide therefrom.

7. Procedure as defined in claim 2, which includes the step of decomposing the aluminum monochloride-containing gas to deposit aluminum therefrom, by effecting heat transfer between said gas and a fluid and thereby transferring the heat of decomposition of the monochloride, into said fluid, and passing said fluid into heat transfer relation with a body of the aforesaid molten salt mixture at a region which constitutes the aforesaid other region, said molten salt mixture being the aluminum trichloride-enriched mixture circulated from the condensing region and said heating of the molten salt mixture to evaporate aluminum trichloride being effected with heat from said fluid, derived from the decomposing reaction in the decomposing region.

8. In procedure for subhalide refining of aluminum that includes passing gas comprising normal aluminum halide into and through a converting region while effecting reaction of said gas with aluminum-containing material in said region to produce gaseous aluminum monohalide in the gas, and thereafter passing said monohalide-containing gas through a decomposing region while there subjecting the gas to cooling for decomposing said monohalide to deposit purified aluminum and to yield gas comprising normal aluminum halide, the process which comprises bringing said last-mentioned gaseous normal aluminum halide into contact with a molten salt mixture which contains such normal aluminum halide and thereby condensing said last-mentioned gaseous halide by absorption in said molten salt mixture at a temperature of such mixture for effecting said absorption, said cooling step in decomposing the aluminum monohalide-containing gas comprising transferring the heat of decomposition of the monohalide into a fluid, said process further comprising bringing successive quantities of said molten salt mixture wherein gaseous normal aluminum halide has been absorbed and successive quantities of said fluid as heated by the decomposition of the monohalide, into heat exchange relation to transfer heat from said last-mentioned fluid to said last-mentioned molten salt mixture and thereby evaporating normal aluminum halide from the molten salt mixture by heat transferred from the fluid, said evaporation of normal aluminum halide establishing a flow of gaseous normal aluminum halide, and conducting said last-mentioned flow of gaseous normal aluminum halide to the converting region to constitute the gas passed through said region for reaction with the aluminum-containing material therein, all of the aforesaid normal aluminum halide being of halogen from the class consisting of chlorine and bromine and said molten salt mixture being a mixture which consists essentially of normal aluminum halide and other metal halide, of halogen from said class, and which in molten state is capable of absorption of normal aluminum halide therein and of evaporation of normal aluminum halide therefrom.

9. The process of claim 2, which includes introducing aluminum trichloride to make up for losses in circulation of aluminum trichloride, by supplying to the first-mentioned circulated gas as such gas is advanced into the converting region, elemental chlorine gas in amount to produce, by reaction with aluminum metal in the converting region, a quantity of aluminum trichloride equal to not more than a few percent of the total aluminum trichloride entering the converting region.

10. The process of claim 6, in which the condensing step comprises absorbing the normal aluminum halide of the gas which was directed to the condensing region, in a molten salt mixture in said region, the condensed halide being transferred to the other region by transferring said molten salt mixture thereto, and the evaporating step comprising evaporating normal aluminum halide in said other region from said molten salt mixture by supplying heat thereto, all of the aforesaid normal aluminum halide being of halogen from the class consisting of chlorine and bromine and said molten salt mixture being a mixture which consists essentially of normal aluminum halide and other metal halide, of halogen from said class, and which in molten state is capable of absorption of normal aluminum halide therein and of evaporation of normal aluminum halide therefrom.

11. In procedure for subhalide refining of aluminum wherein gas comprising normal aluminum halide is continuously advanced through a converting region for reaction of said normal halide with aluminum metal to convert said metal to gaseous aluminum subhalide, and wherein gas containing said subhalide is continuously advanced from said converting region through a decomposing region for decomposition of said subhalide to yield purified aluminum and gaseous normal aluminum halide at a predetermined pressure, the process of providing for re-use of normal aluminum halide in the converting region for reaction therein, which comprises continuously directing substantially all of the gas from the decomposing region, containing the normal aluminum halide, to a condensing region and there continuously condensing substantially all of the normal aluminum halide, of said last-mentioned gas, by absorption in a molten salt mixture at a temperature of said mixture for absorption of said normal aluminum halide therein, circulating said molten salt mixture from said condensing region, as molten salt enriched with said normal aluminum halide, to another region, supplying heat to said enriched salt mixture at said other region and thereby evaporating normal aluminum halide from said mixture to produce a continuous stream of the normal aluminum halide in gaseous form at a pressure higher than the aforesaid predetermined pressure for re-advance under said higher pressure through the converting and decomposing regions, and redirecting said last-mentioned stream of halide to the converting region for advance therethrough as constituting substantially all of the gas supply therefor, said molten salt mixture being continuously recirculated from said evaporating region as aluminum halide-depleted salt, to the condensing region, and then again in enriched form to said evaporating region, all of the aforesaid normal aluminum halide being of halogen from the class consisting of chlorine and bromine and said molten salt mixture being a mixture which consists essentially of normal aluminum halide and other metal halide, of halogen from said class, and which in molten state is capable of absorption of normal aluminum halide therein and of evaporation of normal aluminum halide therefrom.

12. In procedure for subhalide refining of aluminum wherein gas comprising aluminum trichloride is continuously advanced through a converting region for reaction of said trichloride with aluminum metal to convert said metal to gaseous aluminum monochloride, and wherein gas containing said monochloride is continuously advanced from said converting region through a decomposing region for decomposition of said monochloride to yield purified aluminum and gaseous aluminum trichloride at a predetermined pressure, the process of providing for re-use of aluminum trichloride in the converting region for reaction therein, which comprises continuously directing substantially all of the gas from the decomposing region, containing aluminum trichloride, to a condensing region and there continuously condensing substantially all of the aluminum trichloride, of said last-mentioned gas, by absorption in a molten salt mixture at a temperature of said mixture for absorption of said last-mentioned aluminum trichloride therein, circulating said molten salt mixture from said condensing region, as molten salt enriched with aluminum trichloride, to another region, supplying heat to said enriched salt mixture at said other region and thereby evaporating aluminum trichloride from said mixture to produce a continuous stream of aluminum trichloride in gaseous form at a pressure higher than the aforesaid predetermined pressure for re-advance under said higher pressure through the converting and decomposing regions, and redirecting said last-mentioned stream of trichloride to the converting region for advance therethrough as constituting substantially all of the gas supply therefor, said molten salt mixture being continuously recirculated from said evaporating region as aluminum trichloride-depleted salt, to the condensing region, and then again in enriched form to said evaporating region, and said molten salt mixture being a mixture which consists essentially of aluminum trichloride and other metal chloride, and which in molten state is capable of absorption of aluminum trichloride therein and of evaporation of aluminum trichloride therefrom.

13. In procedure for subhalide refining of aluminum wherein gas comprising normal aluminum halide is continuously advanced through a converting region for reaction of said normal halide with aluminum metal to convert said metal to gaseous aluminum subhalide, and wherein gas containing said subhalide is continuously advanced from said converting region through a decomposing region for decomposition of said subhalide to yield purified aluminum and gaseous normal aluminum halide at a predetermined pressure, the process of providing for re-use of normal aluminum halide in the converting region for reaction therein, which comprises continuously directing substantially all of the gas from the decomposing region, containing the normal aluminum halide to a condensing region and there continuously condensing substantially all of the normal aluminum halide, of said last-mentioned gas, to non-gaseous state, while withdrawing from the condensing region all uncondensed remainder of said last-mentioned gas which came from the decomposing region, continuously transferring said condensed halide to a region other than said condensing region, said condensed halide in said other region being established in a molten salt mixture, supplying heat to said molten salt mixture in said other region to evaporate normal aluminum halide continuously from said molten mixture and thereby to restore said normal aluminum halide to gaseous form at a pressure higher than the aforesaid predetermined pressure for re-advance under said higher pressure through the converting and decomposing regions, and redirecting said restored gaseous halide from said last-mentioned other region, to the converting region for re-use therein, all of the aforesaid normal aluminum halide being of halogen from the class consisting of chlorine and bromine and said molten salt mixture being a mixture which consists essentially of normal aluminum halide and other metal halide, of halogen from said class, and which in molten state is capable of absorption of normal aluminum halide therein and of evaporation of normal aluminum halide therefrom.

14. In procedure for subhalide refining of aluminum wherein gas is continuously circulated through a converting region for reaction of gaseous normal aluminum halide, in said gas, to convert aluminum metal to gaseous aluminum subhalide, and through a decomposing region for decomposition of said subhalide to yield purified aluminum and gaseous normal aluminum halide, and then again, as containing said normal halide, to the converting region, the process which comprises continuously withdrawing a portion of the circulating gas at a locality in its travel from the decomposing region to the converting region, condensing the normal halide of the withdrawn gas, at a condensing region, by absorbing normal halide of the withdrawn gas in a molten salt mixture, while separating the uncondensed remainder of said withdrawn gas, comprising permanent gas, continuously transferring said condensed halide to a region other than said condensing region by transferring said molten salt mixture to said other region, and in said other region continuously reconverting said condensed halide to gaseous form by evaporating normal halide from said molten salt mixture by supplying heat thereto, and restoring said normal halide in gaseous form to the circulating gas, all of the aforesaid normal aluminum halide being of halogen from the class consisting of chlorine and bromine and said molten salt mixture being a mixture which consists essentially of normal aluminum halide and other metal halide, of halogen from said class, and which in molten state is capable of absorption of normal aluminum halide therein and of evaporation of normal aluminum halide therefrom.

15. In apparatus for subhalide refining of aluminum, having a converter arranged to be traversed by a stream of aluminum halide gas, for conversion of aluminum metal in the converter to aluminum subhalide gas, and a decomposer arranged to receive gas from the converter, for decomposing said aluminum subhalide to deposit purified aluminum and to discharge normal aluminum halide gas, the combination, with said converter and decomposer, condenser-absorber means having an inlet connected to the decomposer to receive normal aluminum halide gas therefrom, and arranged to hold molten salt, for exposing said received halide gas to said molten salt to condense the halide gas by absorption in the salt, said condenser-absorber means having a discharge passage remote from the inlet, for outlet of uncondensed gas, an evaporator connected to the condenser-absorber means to receive molten salt therefrom and having a gas outlet connected to the converter to deliver normal aluminum halide gas to said converter, said evaporator including heating means for heating the received molten salt to evaporate normal aluminum halide from the salt, and means connected between the condenser-absorber means and the evaporator, for circulating a flow of aluminum halide-enriched molten salt from the condenser-absorber means to the evaporator and a flow of aluminum halide-depleted molten salt from the evaporator to the condenser-absorber means.

16. In a system for subhalide refining of aluminum, a converter arranged to be traversed by a stream of aluminum halide gas, for conversion of aluminum metal in the converter to gaseous aluminum subhalide, a decomposer for aluminum subhalide comprising a vessel connected to the converter for receiving a flow of gaseous aluminum subhalide from the converter, associated means in said vessel for continuously displacing a liquid in distributed form through the vessel in contact with the gaseous subhalide in said vessel, to remove heat from said gaseous subhalide for decomposition of the latter into aluminum metal and gaseous normal aluminum halide, means comprising a second vessel for receiving a flow of molten salt containing normal aluminum halide, said second vessel having associated means communicating with the first vessel for bringing said liquid from the first vessel into heat exchange relation to said molten salt in the second vessel, to evaporate normal aluminum halide from the molten salt by heat from the decomposition in the first vessel, said second vessel having means for discharging a flow of gaseous normal aluminum halide, means connecting said discharging means to the converter, for conducting said last-mentioned flow to the converter, condenser-absorber means connected to the first vessel to receive gaseous normal aluminum halide therefrom, and arranged to hold molten salt, for exposing said last-mentioned received gaseous halide to said last-mentioned molten salt to condense the gaseous halide by absorption in the salt, and means connected between the condenser-absorber means and the second vessel for circulating a flow of aluminum halide-enriched molten salt from the condenser-absorber means to the second vessel and a flow of aluminum halide-depleted molten salt from the second vessel to the condenser-absorber means.

References Cited by the Examiner
UNITED STATES PATENTS

| | | | |
|---|---|---|---|
| 1,778,083 | 10/1930 | Marburg | 23—92 |
| 1,837,199 | 12/1931 | Brode | 23—92 |
| 2,331,988 | 10/1943 | Hoevenstein | 75—68 X |
| 2,387,228 | 10/1945 | Arnold | 23—93 |
| 2,462,661 | 2/1949 | Munday | 75—68 |
| 2,470,305 | 5/1949 | Gross | 75—68 |
| 2,526,564 | 10/1950 | Hepp et al. | 23—96 |
| 2,621,120 | 12/1952 | Pedersen et al. | 75—68 |
| 2,758,023 | 8/1956 | Bareis | 75—63 X |
| 2,760,858 | 8/1956 | Findlay | 75—84.5 |
| 2,762,702 | 9/1956 | Howard | 75—68 |
| 2,797,981 | 7/1957 | Tooke | 23—93 |
| 2,914,398 | 11/1959 | Johnston et al. | 75—68 |
| 2,937,082 | 5/1960 | Johnston et al. | 75—68 X |

FOREIGN PATENTS 342,208  1/1931  Great Britain.

DAVID L. RECK, *Primary Examiner.*

BENJAMIN HENKIN, *Examiner.*